Figure 1:
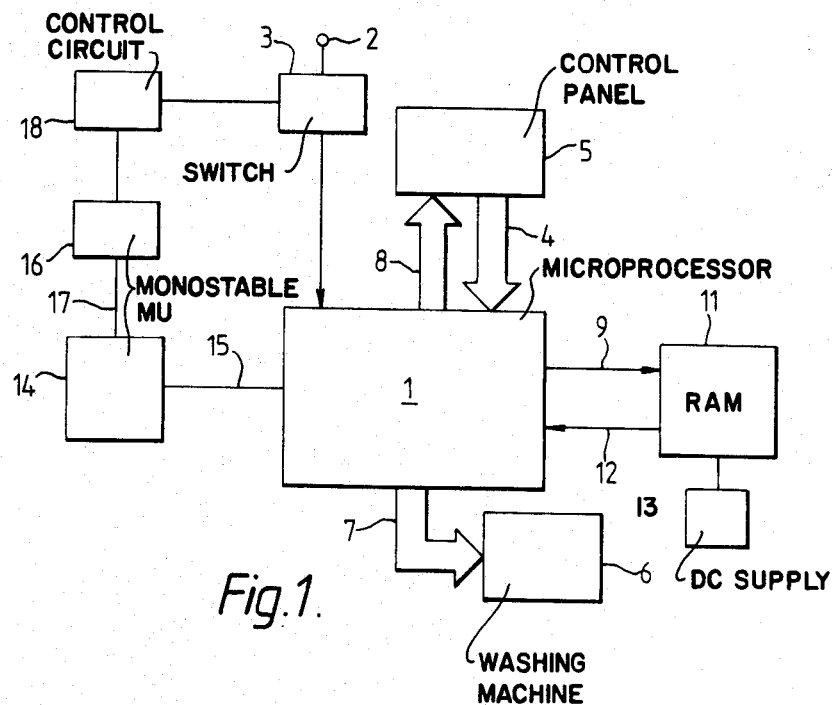

United States Patent [19]

Easthill

[11] Patent Number: 4,642,753
[45] Date of Patent: Feb. 10, 1987

[54] DOMESTIC ELECTRICAL APPLIANCE

[75] Inventor: Stephen P. Easthill, Chessington, England

[73] Assignee: U.S. Philips Corporation, New York, N.Y.

[21] Appl. No.: 637,663

[22] Filed: Aug. 3, 1984

[30] Foreign Application Priority Data

Aug. 17, 1983 [GB] United Kingdom ............... 8322170

[51] Int. Cl.⁴ .................. G06F 15/46; G06F 11/00
[52] U.S. Cl. .................................. 364/184; 364/187; 364/400; 371/66; 371/10
[58] Field of Search .................. 364/184–187, 364/130, 400; 371/10, 12, 13, 14, 21, 61, 62, 66, 16; 365/222, 226, 228, 229

[56] References Cited

U.S. PATENT DOCUMENTS

| | | | |
|---|---|---|---|
| 3,959,778 | 5/1976 | Brette | 364/200 |
| 4,227,798 | 10/1980 | Steiner | 371/62 X |
| 4,393,500 | 7/1983 | Imazeki et al. | 371/13 |
| 4,410,991 | 10/1983 | Lenart | 371/12 X |
| 4,412,284 | 10/1983 | Kerforne et al. | 364/130 |
| 4,429,366 | 1/1984 | Kennon | 371/12 X |
| 4,521,847 | 6/1985 | Ziehm et al. | 364/132 X |
| 4,551,841 | 11/1985 | Fujita et al. | 371/12 X |

Primary Examiner—Joseph Ruggiero
Attorney, Agent, or Firm—Robert T. Mayer; Bernard Franzblau

[57] ABSTRACT

In a domestic appliance, such as a washing machine, controlled by a solid state processor 1, it is possible for power supply interference to corrupt the program data stored in the processor or even to lock out the processor. The adverse effects thereof are eliminated by providing a non-volatile back-up memory 11 for storing the program identity and state, and timing means 14, 16, 18 which, in the event of a power failure or processor lock-out, momentarily disconnects the power supply 2 to the processor 1 by means of a switch 3.

4 Claims, 4 Drawing Figures

DOMESTIC ELECTRICAL APPLIANCE

This invention relates to a domestic electrical appliance, such as a washing machine, including a solid state processor arranged to control the operation of the appliance by selecting an optionally-variable number of operating steps from N such steps in accordance with any one of a number of programmes selectable by the user of the appliance.

One problem that can arise in an appliance which is controlled by a solid state processor, e.g. a microprocessor, a perform a sequence of routines is that any failure of the power supply to the processor during a programme results in the destruction of the data in the processor and, therefore, the information concerning the progress of the programme is lost. This means that when the power supply is restored, the programme has to be restarted from the beginning and, therefore, some of the programme steps are repeated unnecessarily. To overcome this problem, it is known from U.K. patent specification No. 1,529,691 to provide a power failure detector and a data-salvaging store (memory) to which all of the data necessary for the subsequent continuation of the programme are rapidly transferred and in which they are stored if, and only if, a power failure is detected. If the power supply is re-established within a short period, e.g. a few seconds, the programme is able to continue from the point at which it was interrupted. The data-salvaging store is powered by a capacitor which, in operation of the apparatus, is charged by a current derived from the mains power supply. This means that the power has to be restored within the discharge time constant of the capacitor in order to enable all of the data in the temporary salvage store to be read and stored by the processor. The object of that arrangement is to make allowance for momentary failure of the power supply, particularly during unattended operation, such that the programme can continue after the interruption from where it left off, even though the programme details and status have been lost from the processor. If the power is not restored during this short period, the programme is started from the beginning when the power is subsequently restored.

Solid state processors such as microprocessors can, however, be affected in severe environments in that the data stored therein can be corrupted by various forms of interference, such as voltage spikes, static, and the switching of inductive loads such as motors, solenoids, and electromagnetic relays. Such corruption, e.g. to the programme counter, can result in incorrect programme operation. Thus any power supply interference which results in immediate salvaging of the data may also have corrupted that data before, or during, the salvage operation. The interference can be particularly severe if power is being supplied to inductive devices at the instant the power is disconnected. In this case corruption of the data can be caused by the original interference and additionally by the consequent, and subsequent, large voltage spikes caused by breaking inductive circuits.

The corruption may be such that the processor is still able to run although the data stored in its random access memory (RAM), programme counter, etc., is corrupt. This will result in an incorrect programme being run by the processor, with possibly disastrous results. One object of the invention is at least to reduce the possibility of corruption and, hence, its adverse effects.

We have found that in very hostile environments, such as clothes or dish washing machines which include inductive devices, it is possible for the microprocessor to lock out, that is to say that its state cannot be changed by a signal on any of its control inputs including the "reset" input. The data contained in the processor is thus irretrievably lost, of course, but even more serious is the fact that—depending upon the programme step being performed at the instant of lock-out—the inability of the processor to continue with the programme can result in extensive damage, for example by not closing a water inlet valve or not switching off the heating element, if such is provided. A further object of the invention is to eliminate the possibility of such damage in the event of processor lock-out.

According to the present invention, there is provided a domestic electrical appliance including a solid state processor arranged to control the operation of the appliance by selecting an optionally-variable number of operating steps from N such steps in accordance with any one of a number of programmes selectable by the user, a non-volatile store, writing means which—prior to the processing of any said operating step—writes data into the store identifying the selected programme and which—during the processing of the steps—writes data into the store identifying the last operating step processed, readingmeans arranged to read the store contents whereby, on removal and subsequent reconnection of the power supply to the processor, the store contents read enable the latter to continue with the programme if that programme had not been completed at the instant of removal of the power supply, signal means for generating a clock signal only so long as the processor is functioning correctly, and timing means which, in the absence of said clock signal for a time duration at least greater than its clock period, causes a switch to disconnect and then reconnect the power supply to the processor.

It will be noted that, in such an appliance, there is no need for a mains failure detector since no action has to be taken when the mains fail. This represents a useful saving in system complexity and cost.

The non-volatile store can be a conventional, and very cheap, RAM powered by a small rechargeable battery which is trickle-charged from the mains supply. The store is loaded with the programme information before any of the operating steps is processed and, therefore, before the corruption-causing events such as switching on motors and valves has occurred. The possibility of corrupting the programme data in the store is thus minimised.

The progress of the programme steps is also held in the store, which is therefore only accessed for a very short period in each programme step, and this period may be arranged to occur when no switching of the peripheral equipment is taking place. Thus the step data is corruptible substantially only during these short periods and the possibility of such corruption is in any event substantially reduced. As will be explained, even this corruption can be rendered harmless.

Since the store contains sufficient information for the processor to be able to start a new programme, when power is restored to the processor, from the point where the previous programme was interrupted by a power disconnection, this facility is used to restore the programme when the processor becomes locked out. If the processor locks out, then the clock signal ceases and this results in removal of the processor power supply for a brief period. This clears the lock-out and the contents of the store enable the programme to continue from where it was stopped by the lock-out.

Preferably, the store is provided with a respective location for each of the N operating steps and means are provided for loading each of these locations with a given respective data value before any of the operating steps is processed and also for changing this value as each associated operating step is processed.

Thus each of the N locations is loaded with known data before the implementing of any operating step can corrupt it. As each step is performed, the data is changed, leaving the original data at each succeeding step. All that is needed when power is restored is to search through these locations to see if the original data remains at any step. If it does, then that step was not processed before the interruption to the processor power supply and the programme can then be restarted at that step. The given data value at each location may be the same for all the N locations but conveniently the data is the respective address of each location.

Although for convenience the data at each location will obviously be changed to another value when the corresponding operating step is processed, this does not affect the operation since action is only taken in response to the finding of the original data at any step. Thus it does not matter if the data is corrupted while it is being changed.

Figure 2:
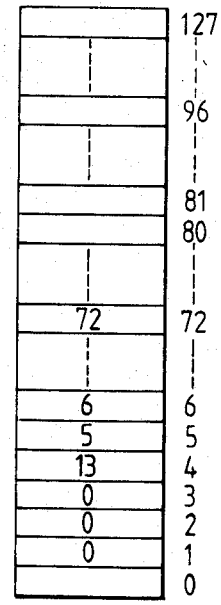
Figure 3:
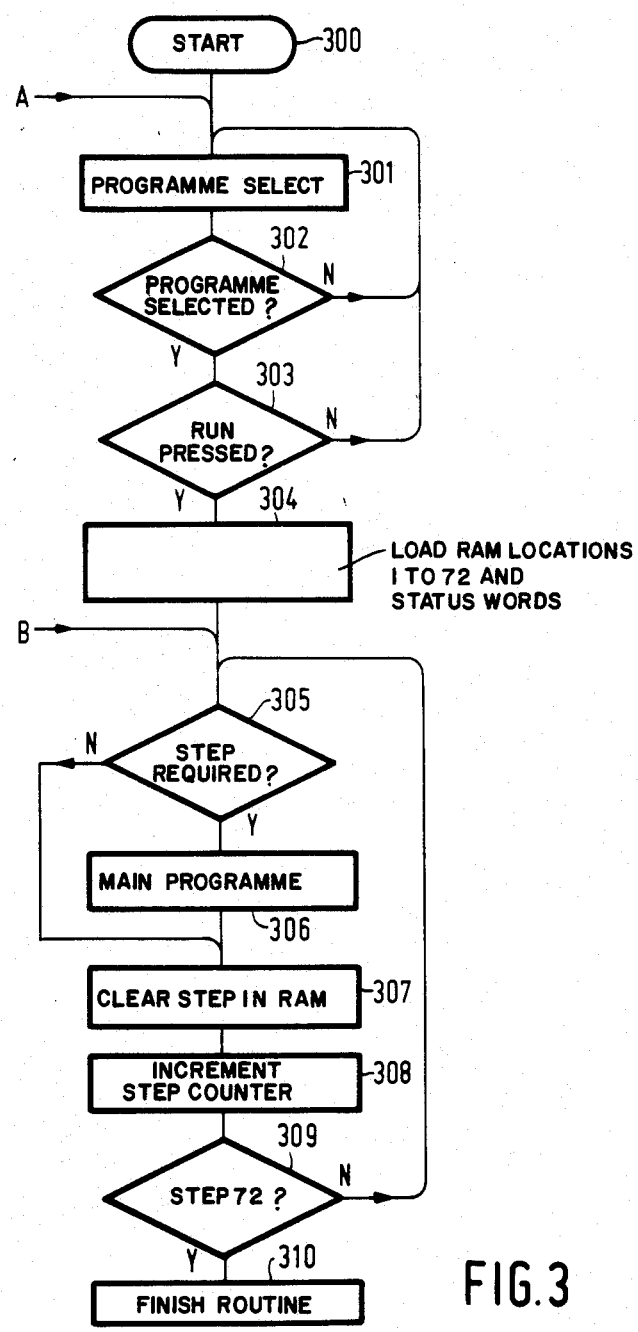
Figure 4:
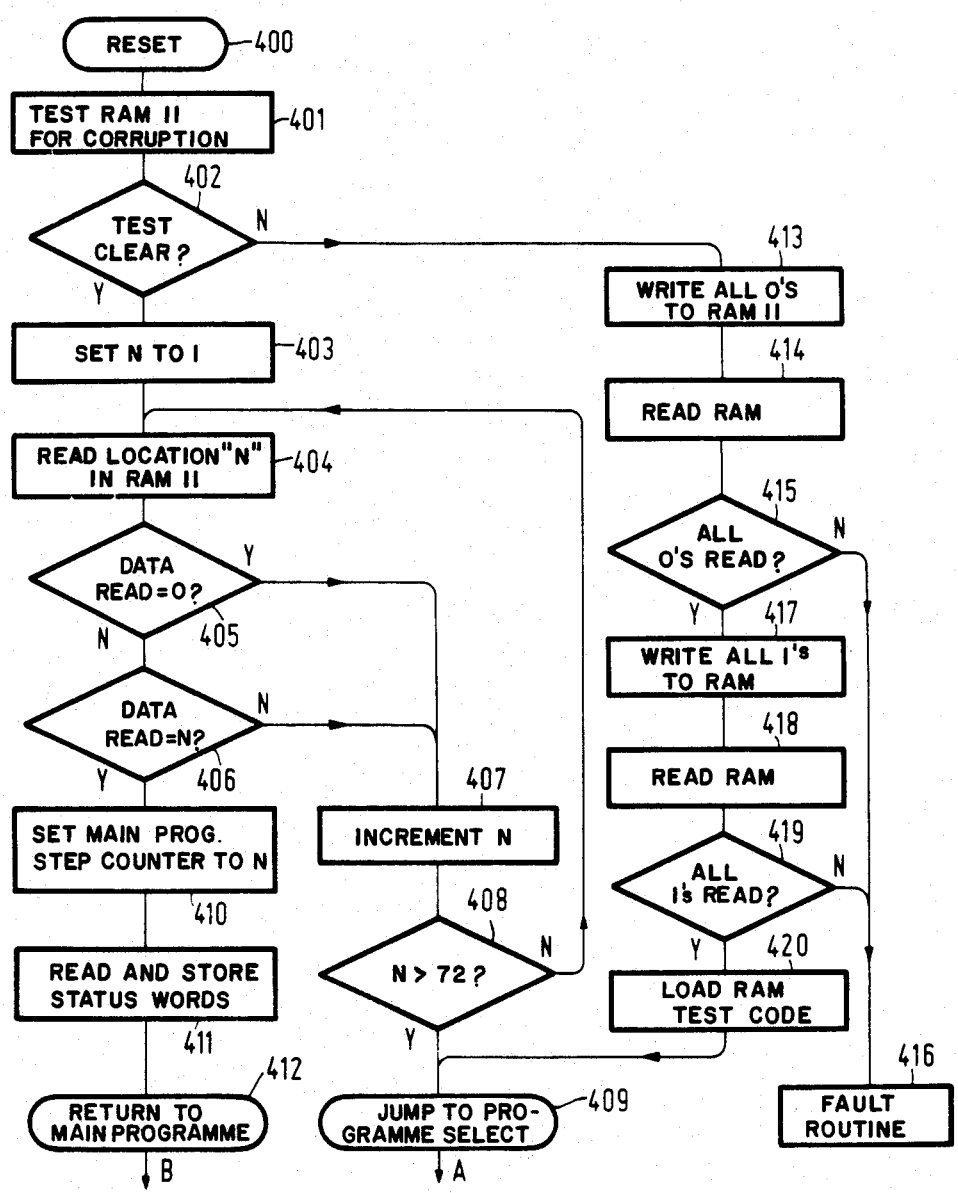

An embodiment of the invention will now be described with reference to the accompanying drawings, in which:

FIG. 1 is a block schematic circuit diagram of appliance control apparatus including a processor, FIG. 2 is a memory map of the non-volatile memory 11 shown in FIG. 1, FIG. 3 is a flow diagram showing the main programmes procedure, and FIG. 4 is a flow diagram showing the start-up programme routine.

In FIG. 1 a microprocessor 1 is powered from a D.C. supply terminal 2 via a switch, e.g. a transistor 3. Input commands to the microprocessor are fed via a bus 4 from a control panel 5. The contron output of the microprocessor 1 is fed to the apparatus 6 to be controlled via a bus 7.

The apparatus may, for example, be a washing machine in which the control panel 5 comprises a number of push-buttons by means of which the user selects a particular one of several main programmes and also decides upon options within the main programme, such as pre-wash, cold wash, and spin delay. The control panel may also accommodate visual indicators which, for example, may indicate the appropriate options for the selected programme, the progress of the programme, and faulty operation. For these functions, information may be fed from the microprocessor via a bus 8. Examples of the control panel 5 and washing machine 6 can be found in the above-mentioned U.S. Pat. No. 1,529,691. The particular arrangements of the control panel and the apparatus are not relevant to the invention, however, and will not be detailed further.

Microprocessor 1 has a write output 9 to a nonvolatile memory, such as a random access memory (RAM), 11 and a read input 12 from RAM 11, the latter being provided with a D.C. supply 13.

A regularly recurrent "refresh" clock signal output from microprocessor 1 is fed to a first monostable (one-shot) multivibrator 14 via lead 15. The output of monostable 14 is connected to the input of a further monostable MV 16 via lead 17. The output of monostable MV 16 controls the on/off state of switch 3 via a control circuit 18 and, hence, controls the power supply to the microprocessor 1. Under normal operating conditions, switch 3 is held in its ON (conducting) state by monostable MV 16 and control circuit 18.

The operation of the circuit shown in FIG. 1 will now be explained with reference to FIGS. 2, 3 and 4.

In FIGS. 3 and 4 the various boxes have the following significances.

FIG. 3.
300—Start
301—Programme select.
302—Programme selected?
303—Run pressed?
304—Load RAM locations 1 to 72 and status words.
305—Step required?
306—Main programme.
307—Clear step in RAM.
308—Increment step counter.
309—Step 72?
310—Finish routine.

FIG. 4.
400—Reset.
401—Test RAM 11 for corruption.
402—Test clear?
403—Set N to 1.
404—Read location "N" in RAM 11.
405—Data read=0?
406—Data read=N?
407—Increment N.
408—N greater than 72?
409—Jump to programme select.
410—Set main programme step counter to N.
411—Read and store status words.
412—Return to main programme.
413—Write all "0"s to RAM 11.
414—Read RAM.
415—All "0"s read?
416—Fault routine.
417—Write all "1"s to RAM.
418—Read RAM.
419—All "1"s read?
420—Load RAM test code.

It is first assumed that any of the selectable programmes and options may be run by the microprocessor by selection from 72 basic step routines held in a read-only memory (ROM) portion of the processor. Thus the main programme facilities are written into a total of 72 steps. As each step is completed, a step counter is incremented by 1 and, by referring to a look-up table, a check is made to see if the next sequential step is required for that particular programme. If not, the step counter is further incremented and the check is again made. The programme is terminated after step 72. RAM 11 has 72 corresponding locations 1 to 72 (FIG. 2). It has two further locations 80, 81 for programme status words and a further 32 locations 96 to 127 which are designated as a RAM test area. The status words identify the particular programme and option details selected by the user on control panel 5. The addresses 96 to 127 are loaded with a test code, for example alternate 0's and 1's.

Referring now to FIG. 3, the user switches on the machine and selects the programme and options. On start-up, the routine checks that a programme has been selected and then waits for the user to operate the "RUN" button to start the programme running. When.

this is done, RAM locations 1 to 72 are each loaded with their respective location numbers and locations 80 and 81 are loaded with the programme status words.

The processor then checks against a look-up table (e.g. an internal read-only memory) to see if the first step is required in the main programme. If "yes", then this step is carried out in the main programme and the first RAM location (1) is cleared to 0. If "no" then location 1 is cleared without step 1 being included in the main programme. The counter is then incremented and the process repeated one step at a time until all 72 steps have been completed, whereupon the routine is terminated.

At the end of the whole routine, all of the 72 step locations in RAM 11 should be cleared to zero unless there has been a mains supply interruption or other interference.

On initial power-up, the start-up routine shown in FIG. 4 is run. RAM 11 is first tested for possible data corruption by checking the test code stored in locations 96–127. Data corruption may have been caused, for example, by a low voltage, a momentary break in the power supply, or by interference from voltage spikes. The check may be effected by a simple correlation method or by a sequence test which checks the code for alternate 0's and 1's. Obviously, other test codes could equally well be used, such as the all-1's code in which the correlator is merely an AND gate. It is preferred, however, to have both 0's and 1's in the code. If the test reveals corruption of the test code, then a further test is carried out which loads up the test code locations with one or more check codes and then reads the check codes to see if they are correctly loaded. For example the all-0's code may be written into the test area locations and the stored code then read from the RAM. If the correct all-0's code is read, then the all-1's code may be stored and, if this is also read satisfactorily, then it is assumed that there is no permanent fault on the RAM and the start-up programme then jumps (lead A) to the programme select stage shown in FIG. 3. Thus if a corrupted test code is found in the RAM, the main programme is started from the beginning irrespective of whether or not there has been a mains failure. The reason for this is that if the RAM test code has been corrupted then it is possible that data in the processor has also been corrupted. It is therefore safer to start the new programme from the beginning. Alternatively, of course, a "yes" response to the "all 1's read" stage could return the start-up routine to the "set N to 1" stage.

If the all-0's and all-1's codes are not read satisfactorily, it is assumed that the RAM has an inherent fault and a fault routine comes into operation. This routine would generally cause an audible and/or visible alarm to be given and prevent further operation of the apparatus.

It should be noted that the RAM is tested and loaded before any of the main programme steps are implemented. The reason for this is that the stored data is then less likely to be corrupted by, for example, the switching on or off of an electromagnetic relay, pump, or motor.

If the RAM corruption test is clear, the data stored at each of the 72 locations of RAM 11 is next tested in sequence by means of a local N-counter which is first set to location 1.

If the previous programme has run satisfactorily, the data stored at every location 1 to 72 will be zero since each location is cleared to zero in sequence during the running of the main programme. If, however, there has been a mains failure during any step in the running of the previous programme, then the preceding RAM locations would contain zeros and the subsequent locations would contain their respective addresses. This situation is shown in FIG. 2, in which steps 1 to 4 are assumed to have been completed satisfactorily in the previous programme. The data in each of the locations 5 to 72 still corresponds to the respective address, however, and this indicates that these steps were subsequent to the mains failure and were not included in the previous programme. The data at location "4" has been corrupted for some reason or other but, since such corruption can only occur while the location is being addressed (i.e. cleared to zero), it is assumed that the corresponding programme step has been satisfactorily completed.

Returning now to FIG. 4, with the N-counter set to N=1, location 1 is read. The zero at this location (FIG. 2) indicates that this step was performed in the previous programme. The counter is therefore incremented to N=2 and, since N is less than 72, location 2 is read. The process is repeated until step N=4 is reached. The data (13) at this location is neither N (i.e. 4) nor zero and is therefore false. This could have been caused for example by a failure or disturbance during the clearing of the location to zero after step 4 was performed during the previous programme. Since the data read is neither zero nor N, it is ignored and the N-counter is incremented to the step N=5.

The data at location 5 is still at N=5 and has not been cleared to zero during the previous programme. Therefore step 5 is the first step that had not been performed in the previous run. The main programme step counter in the processor is now set to 5, the status words are then read and stored in the RAM, and the routine is transferred (lead B) to the main programme (FIG. 3) which then determines if this step is required. In this manner the earlier programme, during which a mains failure occurred, is now completed automatically without needing the attention of the user.

Summarising the operation, the non-volatile memory contains a map of the requested programme information to run and each stage is cleared on completion. During the initial power-up stage, the memory is first read for a previous power supply interruption and, if there has been an interruption, the programme is re-established to continue from where it was discontinued by the interruption.

In order to maintain the information stored in RAM 11 when the supply is interrupted, it is provided with its own D.C. power supply 13. The supply 13 may, for example, comprise a high value storage capacitor charged from the supply 2 or may comprise a rechargeable battery which is trickle-charged, for example, from supply terminal 2. The current taken by the memory 11 is very small and the battery can have a relatively low storage capacity. In a particular embodiment, the microprocessor 1 was a Philips Type MAB 8400B and RAM 11 was a Philips Type PCD 8571.

Although in the embodiment described the step locations are each pre-loaded with their own addresses and then cleared to zero as each step is implemented, alternative data can of course be used. All that is necessary is that each RAM location be pre-loaded with a first predetermined data and this be changed as each step is processed.

If the user wishes to change a programme during operation and switches off the machine to cancel the existing programme, then on switching on the machine and operating the RUN button the programme will automatically start from the step at which the previous programme was terminated. This is entirely satisfactory in the most common case where the user wishes to alter a subsequent step in the programme being run, for example to change the spin-drying time. On the other hand, it is possible that the user may select a programme and, having started the programme, decide that a different programme is required—for example to add a pre-wash step. To provide for this facility, a user-operated escape routine may be included in which the contents of the RAM 11, apart from the test location, are cleared. This may be achieved, for example, by the provision of a programme CANCEL button which, when operated by the user, clears the RAM. In order to avoid the need for providing a CANCEL button in addition to the RUN button, the latter can conveniently be used for both purposes. Thus, for example, the processor or other timer may be used to detect whether the RUN button is operated for a period of less than or greater than 5 seconds, for example. If the button is held for more than 5 seconds then the RAM clearing routine is initiated.

As explained above with reference to FIG. 1, the processor 1 provides a continuous stream of refresh pulses on lead 15 while in operation. On initial power-up, the first of these pulses sets the first monostable 14 to the beginning of its timed "release" period. This release period is considerably longer (e.g. 100 mS) than the periodicity of the refresh signals (e.g. 10 mS) and so the monostable cannot release so long as the signals are present. If the processor stops operating for any reason, such as a lock-up condition described above, the refresh pulses cease and so the monostable 14 releases at the end of its timed release period and triggers the operation of the second monostable 16. The second monostable switches off switch 3 for the timed period (e.g. 100 mS) and so cuts off the power supply to the processor 1 for this short period. As explained above, the removal of power from the processor releases it from a locked-up state. The temporary programme data stored in the processor is lost and this would normally necessitate having to start the programme again from the beginning. In the present case, however, the step at which the processor locked up in the previous programme is, in effect, stored in the memory 11 and, as described above, the programme is automatically started again from where it left off without requiring the intervention of the user.

It may be possible for a processor to lock itself in a local loop such that, although the main programme is stopped, the refresh pulses continue to be provided. In such an event, of course, power will not be removed from the processor in the manner described above. This problem may readily be overcome by providing the refresh pulses in dependence upon the continuance of the programme cycles. Thus, for example, a pulse may be generated at the beginning of each cycle and complemented on alternate cycles. This would produce a pulse train 1,0,1,0,1, ... etc. so long as the cyles continue. At a point most remote from the beginning of each cycle (e.g. halfway through the cycle), a flag is enabled to be set and reset continuously by the pulses of the pulse train. This flag signal then comprises a series of pulses which cease if the processor gets locked in a local loop. These pulses can therefore be used as the refresh pulses to the first monostable 14, whereby the power to the processor is automatically disconnected in the case of local lock-up.

It will of course be appreciated that, although the value of 72 has been chosen for N in the foregoing embodiment, any other number may be chosen in dependence upon the particular requirements of the appliance programmes concerned.

What is claimed is:

1. A domestic electrical appliance comprising, a solid state processor arranged to control the operation of the appliance by selecting an optionally-variable number of operating steps from N such steps in accordance with any one of a number of programs selectable by the user, a power supply, a switch for connecting the power supply to the processor, a non-volatile memory, writing means which—prior to the processing of any said operating step—writes data into the memory identifying the selected program and which—during the processing of the steps—writes data into the memory identifying the last operating step processed, reading means arranged to read the memory contents whereby, on removal and subsequent reconnection of the power supply to the processor, the memory contents read enable the processor to continue with the program if that program had not been completed at the instant of removal of the power supply, signal means for generating a clock signal only so long as the processor is functioning correctly, and timing means which, in the absence of said clock signal for a time duration greater than the clock period, causes the switch to disconnect and then reconnect the power supply to the processor.

2. A domestic electrical appliance as claimed in claim 1 wherein the memory is provided with a respective location for each of the N operating steps, and means for loading each of the locations with a given respective data value before any of the operating steps are processed and for changing said value as each associated operating step is processed in sequence.

3. A domestic electrical appliance as claimed in claim 2 wherein the respective data value at each location is the address of that location.

4. A domestic electrical appliance as claimed in claim 3 wherein the processor changes said value to zero as each operating step is processed.

* * * * *